US007359555B2

(12) United States Patent
Porikli et al.

(10) Patent No.: US 7,359,555 B2
(45) Date of Patent: Apr. 15, 2008

(54) DETECTING ROADS IN AERIAL IMAGES USING FEATURE-BASED CLASSIFIERS

(75) Inventors: Fatih M. Porikli, Watertown, MA (US); Jie Shao, Silver Spring, MD (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 712 days.

(21) Appl. No.: 10/961,926

(22) Filed: Oct. 8, 2004

(65) Prior Publication Data

US 2006/0078205 A1 Apr. 13, 2006

(51) Int. Cl.
*G06K 9/46* (2006.01)
*G06K 9/40* (2006.01)
*G06K 9/00* (2006.01)

(52) U.S. Cl. ...................... 382/204; 382/266
(58) Field of Classification Search ............... 382/104, 382/165, 168, 190, 195, 197, 199, 202–205, 382/209, 219, 220, 261, 262, 264, 266, 272, 382/274, 281; 701/50, 200, 208, 223; 702/5; 340/937, 988, 995
See application file for complete search history.

(56) References Cited

U.S. PATENT DOCUMENTS

| | | | | |
|---|---|---|---|---|
| 4,906,940 A * | 3/1990 | Greene et al. | ............... | 382/100 |
| 5,631,982 A * | 5/1997 | Inselberg et al. | ........... | 382/281 |
| 5,706,355 A | 1/1998 | Raboisson et al. | ......... | 382/104 |
| 5,719,773 A * | 2/1998 | Choate | ...................... | 701/223 |
| 5,848,373 A * | 12/1998 | DeLorme et al. | ........... | 701/200 |
| 6,085,135 A * | 7/2000 | Steckel | ........................ | 701/50 |
| 6,591,187 B2 | 7/2003 | Hotta | .......................... | 701/208 |
| 6,654,690 B2 * | 11/2003 | Rahmes et al. | ................ | 702/5 |
| 6,721,660 B2 | 4/2004 | Kim et al. | ..................... | 702/5 |
| 2003/0223615 A1 | 12/2003 | Keaton et al. | ............. | 382/100 |
| 2004/0034473 A1 | 2/2004 | Kim et al. | ..................... | 702/5 |
| 2006/0078205 A1 * | 4/2006 | Porikli et al. | ............... | 382/204 |
| 2006/0136126 A1 * | 6/2006 | Coombes et al. | ........... | 701/208 |

OTHER PUBLICATIONS

Laptev, et al., "Automatic extraction of road from aerial images based on scale space and snakes," Machine Vision and Application, Springer-Verlag, 2000, vol. 12, pp. 23-31.
G. Vosselman and K. J.de. Road tracing by profile matching and kalman filtering. In *Automatic Extration of Man-Made objects from Aerial and Space Images*, pp. 265{274. Birkhauser Verlag, 1995.
Nevatia, et al., "A System for Building Detection from Aerial Images.", 2000.
R. RuskÄone and S. Airault. Toward an automatic extraction of the road network by local interpretation of the scene. *Photogrammetric Week*, pp. 147-157, 1997.

(Continued)

*Primary Examiner*—Amir Alavi
(74) *Attorney, Agent, or Firm*—Dirk Brinkman; Clifton D. Mueller; Gene V. Vinokur

(57) ABSTRACT

A method detects roads in an aerial image of ground topology by determining low-level features, such as intensities and gradients, for each pixel in the aerial image, determining middle-level features, such as an orientation for each pixel from the low-level features, and determining high-level features from the middle-level features. Each high-level feature is assigned a probability, and the probabilities of the high-level features for each pixel are normalized and aggregated to a single probability that the pixel is associated with a road.

15 Claims, 8 Drawing Sheets

OTHER PUBLICATIONS

Fortier, et al., "Survey of Work on Road Extraction in Aerial and Satellite Images.", 1995.

Horst, et al., "Efficient piecewise linear approximation of space curves using chord and arc length," Proceedings of the SME Applied Machine Vision '96 Conference, Ohio, Jun. 1996.

Unsalan, et al., "Classifying Land Development in High-Resolution Panchromatic Satellite Images Using Straight-Line Statistics," IEEE Transactions on Geoscience and Remote Sensing, vol. 42, No. 4, Apr. 2004.

Heipke, et al., "A Hierarchical Approach to Automatic Road Extraction From Aerial Imagery.", 1996.

P. Kruizinga, N. Petkov, and S. E. Grigorescu. Comparison of texture features based on gabor filters. In *Proc. of the 10th International Conference on Image Analysis and Processing*, pp. 142{147, Venice, Italy, Sep. 27-29, 1999.

C. Steger, "Ann unbiased detector of curvilinear structures," IEEE Trans. On Pattern Analysis and Machine Intelligence, 20(2): 113-125, 1998.

\* cited by examiner

300

DETECTING ROADS IN AERIAL IMAGES USING FEATURE-BASED CLASSIFIERS

FIELD OF THE INVENTION

The present invention relates generally to a method for detecting roads in aerial images, and more particularly to classifying high-level image features to detect the roads.

BACKGROUND OF THE INVENTION

Aerial images can be used to detect topographic objects, such as roads. Image data associated with the roads can be used to generate maps and navigational aids. Manual road detection in aerial images is time-consuming. Therefore, automated methods are preferred.

Some methods extracts parallel edges and extrapolate and match profiles in high-resolution images. Another method searches for an optimal path between a small number of given points. The points are then connected by dynamic programming. A model-based optimization of ribbon snake networks has also been used to improve coarsely digitized road networks in some of the applications. Another method starts with fully automatic extraction and manually edits the results. Another method complements a low-level Markov random field (MRF) model for the extraction of road 'seeds' and the tracking of roads with a simple clutter and occlusion model and a Kalman filter. Another method improves road detection by modeling context, such as shadows, cars or trees hindering or supporting the extraction of the road.

Learning methods use groups of parallel segments or detect ridge-like descriptors with multi-scale methods. Hough transforms can also be used.

It is desired to provide a fully automated method for detecting roads in aerial images.

SUMMARY OF THE INVENTION

The invention provides a method for detecting roads in an aerial image of ground topology by determining low-level features, such as intensities and gradients, for each pixel in the aerial image, determining middle-level features, such as an orientation for each pixel from the low-level features, and determining high-level features from the middle-level features. Each high-level feature is assigned a probability, and the probabilities of the high-level features for each pixel are normalized and aggregated to a single probability that the pixel is associated with a road.

DETAILED DESCRIPTION OF THE PREFERRED EMBODIMENT

Characteristics of Road Features

Our invention provides a method for detecting roads in aerial images of ground topology. We rely on relationships between physical characteristics and visual characteristics of the ground topology. We use features of the visual characteristics to classify image pixels as probably being road pixels or non-road pixels. The physical characteristics can generally be categorized as geometrical, textural, and contextual.

The width of a road is relatively constant and has an upper bound, which is dependent on the importance of the road. In our aerial images of ground topology, the upper bound of the width is about thirty pixels. It should be noted that this value can be adjusted according to the application and the types of aerial images used, e.g., images acquired by low-flying helicopters, high-flying reconnaissance planes, or satellites. The local curvature of a road is changed in a continuous manner, with an upper bound depending on the importance of the road. It should be noted that roads are generally straight locally, but may not be straight globally. Roads linking places form a network. The density of roads and density of connections depend on the surrounding context.

Roads are built using materials such as concrete and asphalt. Therefore, the surface of a road is firm and smooth. Consequently, most roads have a texture that is substantially different from adjacent areas. Roads mostly have distinctive colors different than adjacent areas, e.g., black or gray.

Most roads have edge features such as curbs, gutters, berms, railings, safety barriers, lane marking, and buildings. These provide intensity discontinuousness between the roads and the adjacent areas. Roads usually have homogeneous local orientation distributions, while the orientation of adjacent buildings is usually random.

These characteristics have different advantages and disadvantages. Geometric characteristics are good at indicating global configurations of roads by continuous contours with appropriate curvatures and parallel borders. However, road edges can be occluded in aerial images. Texture can discriminate roads from adjacent areas. However, roofs and parking areas can have similar colors and materials. Roads tend to have a uniform local orientation compared with non-road areas. However, some large open areas can also present uniform orientations.

This means that relying on a single or small number of features is likely to yield erroneous results. Therefore, the method according to the invention integrates a large number of features in a complementary manner to provide more reliable classification results.

Levels of Road Features

Figure 1A:
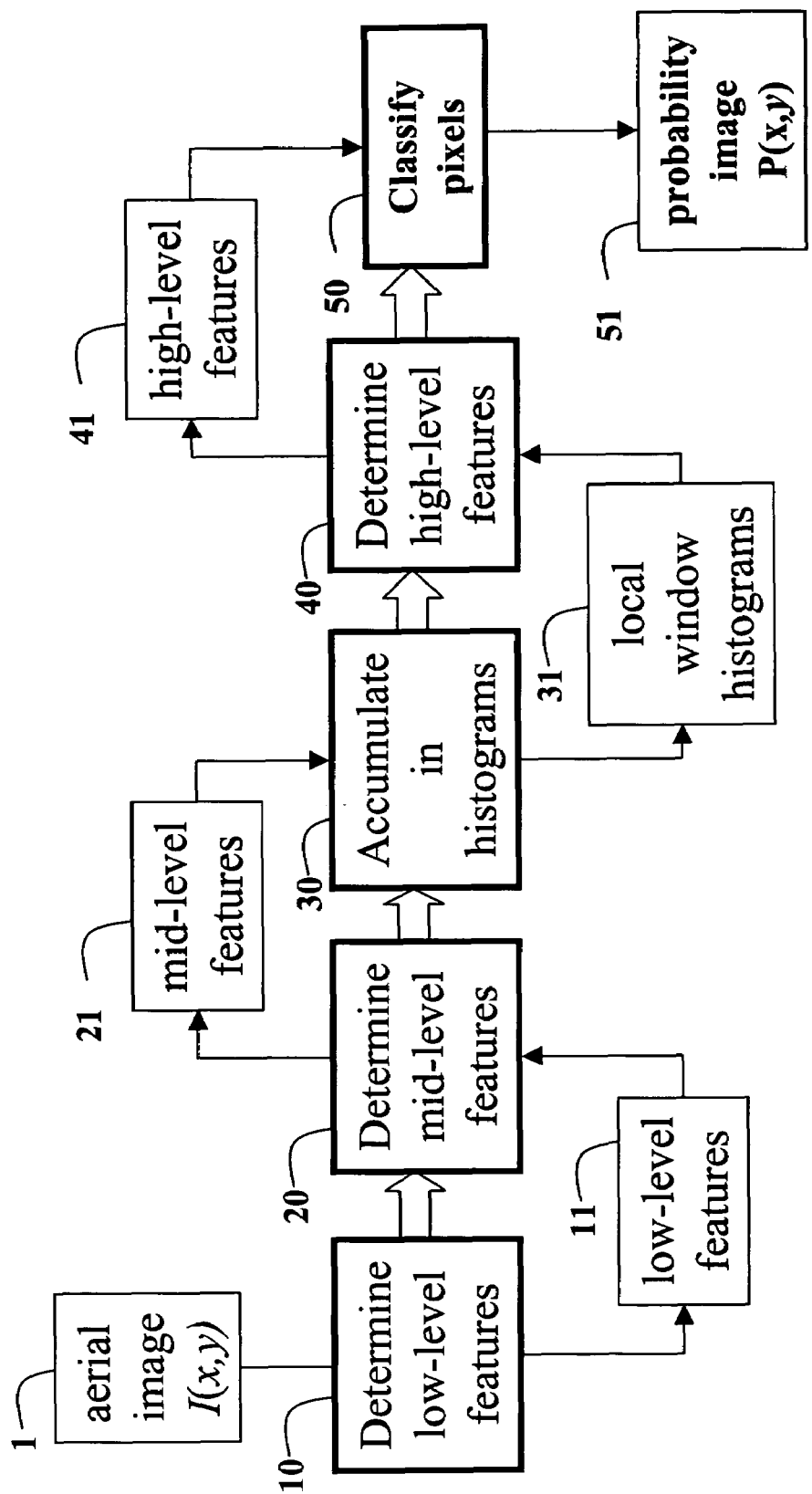
FIG. 1A is a flow diagram of a method according to the invention for detecting roads in aerial images.

As shown in FIG. 1A, we determine 10 for an aerial image 1 low-level features 11. The low-level features are the raw intensity values of the pixels. The intensity values of the three RGB channels give color. We also consider gradients of the intensity values to be low-level features.

From the low-level features, we determine 20 middle-level features 21 such as orientations, edges and contours related to the visual characteristics described above. The middle-level features 21 for each pixel are accumulated 30 in a histogram 31 of a local window placed over each pixel.

Then, we determine 40 high-level features 41 for each pixel from the histograms values. All of the high-level 41 features of each pixel are classified 50 into a single probability. The probability indicates likelihood that the pixel is associated with a road. In the probability image 51, each pixel has a probability in the range zero to one of being associated with a road or not.

Pre-Processing

Figure 1B:
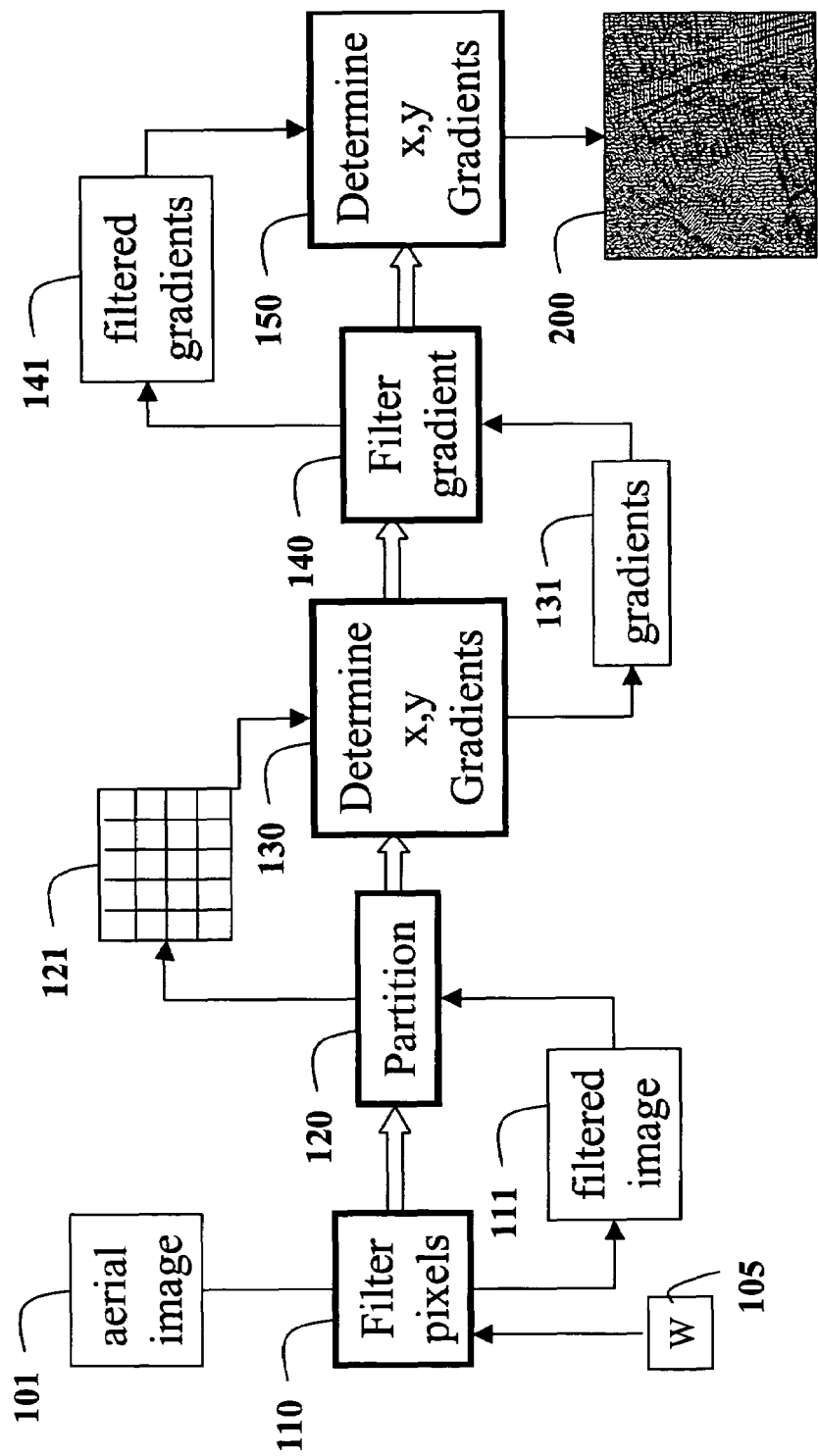
FIG. 1B is a flow diagram of pre-processing steps of the method of FIG. 1A.

As shown in FIG. 1B, we begin with an aerial image 101 of ground topology. As a characteristic, the aerial image 101 has a low resolution with a large amount of noise. Therefore, we first apply 110 a filter 105 to the intensity values of pixels I(x, y) of the image 101. It should be noted that the pre-processing is an optional step to improve the performance of the method according to the invention.

We filter 110 by applying an adaptive 2D Gaussian low-pass Wiener filter (W) 105 to each pixel. The filter uses 5×5 pixel neighborhoods to estimate the mean and standard deviation of the local gradient of each pixel. This reduces the noise. It should be noted that other filtering techniques can be used.

Next, we partition 120 the filtered image 111 into non-overlapping blocks 121 of n×n pixels. The size of the blocks can be application specific. For example, the size of the blocks can vary depending on a resolution of the image, which can dependend on the altitude at which the image was acquired.

Then, we determine 130 the magnitudes of x and y gradients ($G_x$ and $G_y$) 131 of each pixel in each block. This is done by taking the average of two neighboring pixels. As stated above, we consider the intensities and gradients to be low-level features.

We filter 140 the gradient magnitudes the same way we filter the pixels. From the filtered gradients 141 for each block, we determine 150 an orientation image 200 according to:

$$\Theta = \frac{1}{2} \arctan \frac{\sum_{i=1}^{n} \sum_{j=1}^{n} 2 G_x(i,j) G_y(i,j)}{\sum_{i=1}^{n} \sum_{j=1}^{n} (G_x^2(i,j) - G_y^2(i,j))}. \quad (1)$$

As stated above, we define the orientations to be mid-level features.

Figure 2:
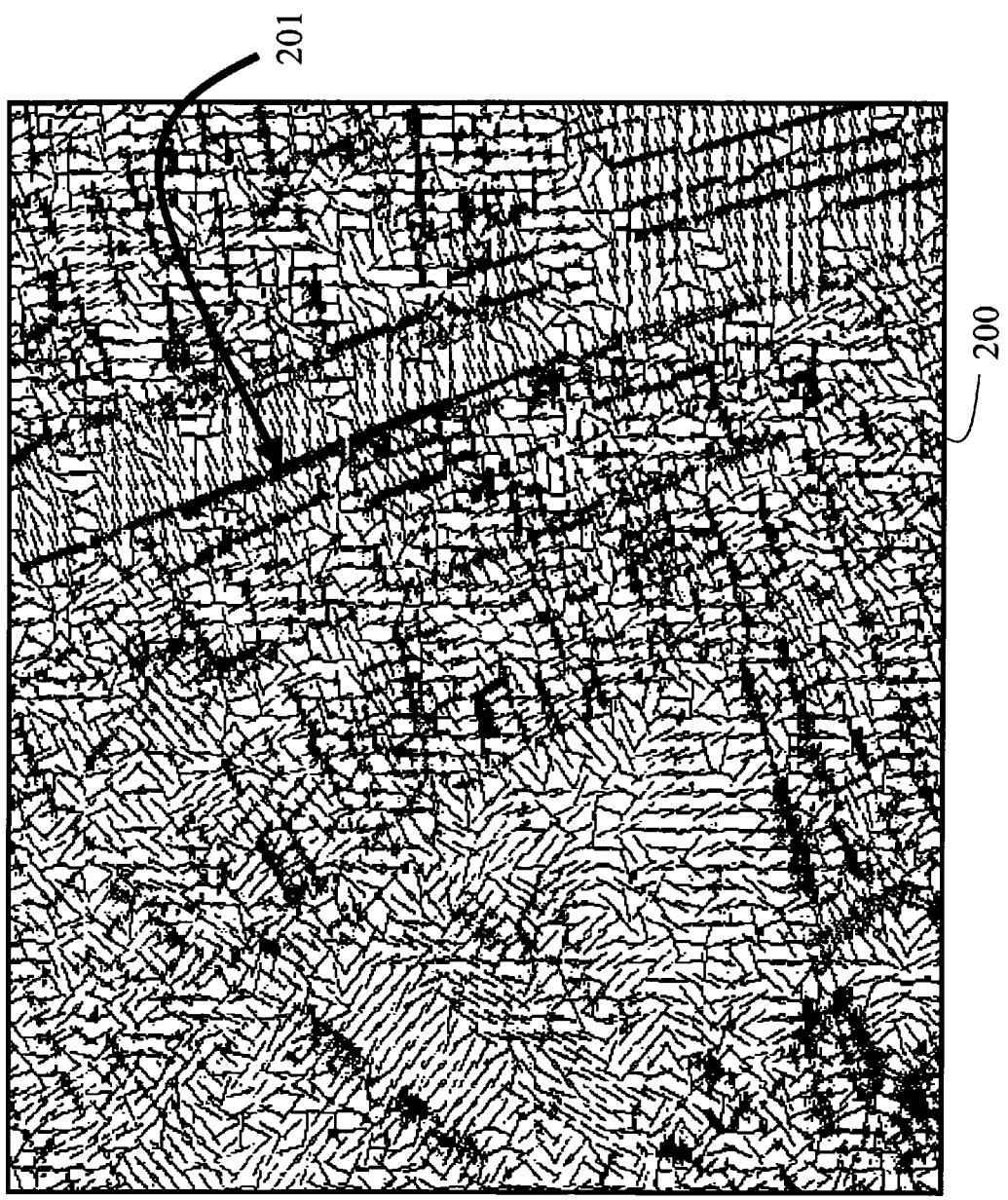
FIG. 2 is an orientation image according to the invention.

FIG. 2 shows the orientation image 200 for an example image. Because of the noise reduction, we find more homogeneous local orientation distributions in road areas 201. We use this observation in the following high-level feature selection steps.

Feature Selection

Figure 3:
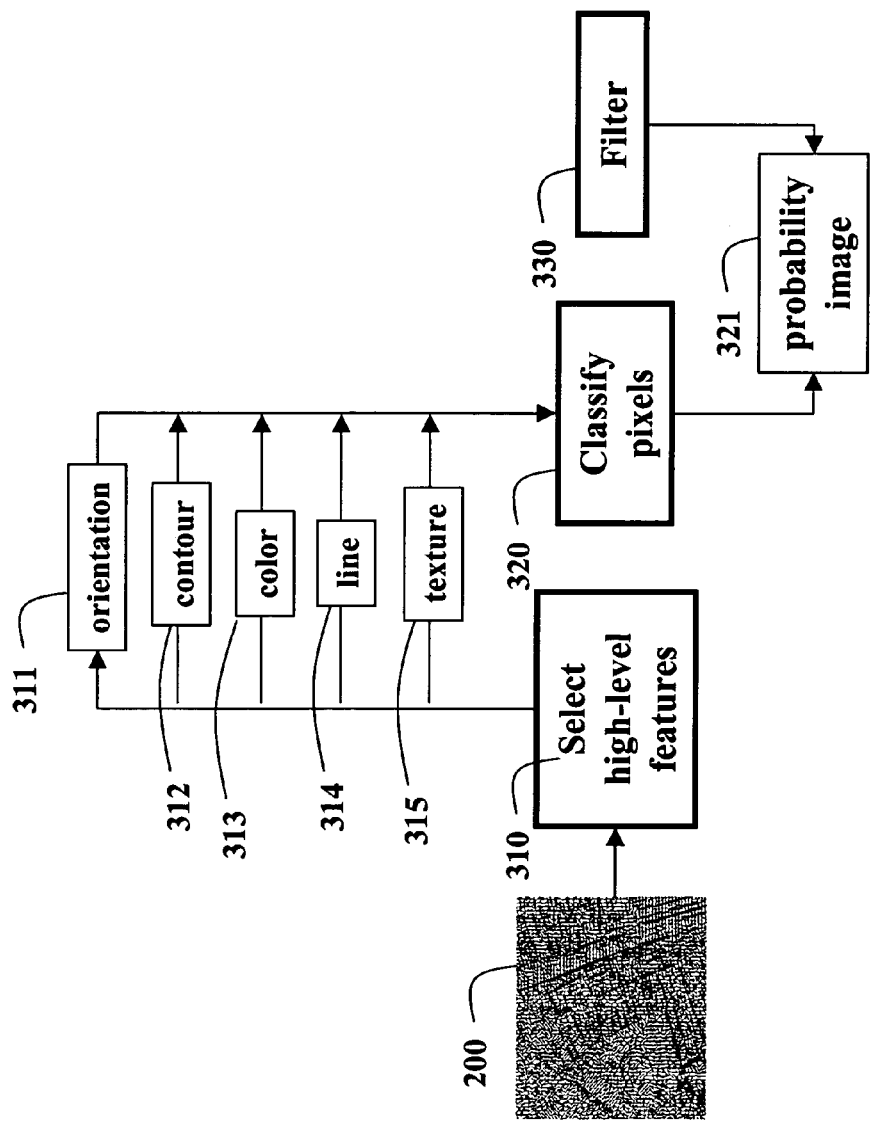
FIG. 3 is a flow diagram of processing steps of the method of FIG. 4.

As shown in FIG. 3, we next select 310 high-level, orientation 311, contour 312, color 313, line 314, and texture 315 features that are statistically significant for classification 320. The classifier constructs a probability image 321. In the probability image, each pixel of the image 101 is given a probability of being a road, or not. The probabilities can be real numbers in the range from zero to one. Noise in the probability image 321 can be reduced by applying 330 a median filter, as is done for the original image 101.

Orientation Features

We use the orientation image 200 to select orientation features 311. The orientation features are selected from local windows of a predetermined size, e.g., 31×31, or about 1000 pixels. The size of the windows is substantially the same as the width of roads as seen in aerial images. The windows overlap in each direction. Therefore, a particular feature located partially in one window is likely to be located entirely in an adjacent window.

We select seven high-level features from the mid-level orientation features. The orientation features are based on a local orientation histogram derived from the orientations in the local windows, and a weighted local orientation histogram with corresponding weighted orientations.

The orientation range in the local window histogram is quantized to twelve bins between 0 and π or radians. The normalized histogram for bin i is h(i), and the normalized weighted histogram is wh(i). Each pixel is represented by a mid-level orientation feature vector $\vec{c}(i,j)$ as stored in the orientation image 200, where i, j are the pixel coordinates, $\|\vec{c}\|$ is the corresponding magnitude of the orientation in the orientation image 200, and arctan $c_x/c_y$ is the corresponding orientation of that pixel.

Maximum of Histogram

A first high-level feature is a maximum value $h_{max}$ of the local orientation histogram, reflects whether a principal orientation exists in the local window. A higher value for $h_{max}$ means that the distribution of the local orientations is more uniform. This indicates that this area should probably be classified as road.

Entropy of Histogram

The second high-level feature is the entropy $E_h$ of the histogram expressed as an approximate probability mass function (pmf). If the approximate pmf is h(i), for i=1, ... N, then the corresponding entropy is $$E = -\sum_{i=1}^{N} [h(i) \log_2(h(i))].$$

The entropy E measures the uncertainty of the information in the histogram. The orientations are distributed uniformly when the entropy is low, and random if high.

Entropy of Weighted Histogram

The third high-level feature is the entropy of the weighted histogram $Ew_h$:

$$E_{wh} = -\sum_{i=1}^{N} [wh(i) \log_2(wh(i))].$$

Mean of Vectors in Local Window

A fourth high-level feature $u_c$ is the mean of the orientation vectors in the histogram of the window. Locally uniform orientations have a higher mean.

Variance of Vectors in Local Window

The fifth high-level feature $v_c$ is the variance of the orientation vectors in the histogram of the window. Locally uniform orientations have a lower variance.

Histogram Convolution with Single-Modal Density Function

The sixth high-level feature $R_{gh}$ is a similarity measure to an idealized road. This is obtained by a cross-correlation between the local orientation histogram and an idealized single-modal density function model, which has a Gaussian mode at π/2 radians. The idealized model represents the road regions under the assumption that there is a dominant direction:

$$g(t) = \frac{1}{2\sqrt{0.2\pi}} \left[ \exp\left(-\frac{1}{2}\left(\frac{t-\pi/2}{0.1}\right)^2\right) \right] \quad (2)$$

$$R_{gh} = \max_t \{g(t) \otimes h(t)\}, \quad (3)$$

where the denominator of 0.1 provides a tolerance for the parallelness of straight lines in the local window.

Weighted Histogram Convolution with Single-Modal Density Function

The seventh high-level feature $r_{wgh}$ is a weighted similarity measure $$R_{wgh} = \max_t \{g(t) \otimes wh(t)\}. \quad (4)$$

These high-level features have good separability between road and non-road areas.

Contour Features

Contour features 312 provide a good compliment to the local orientation features because contours characterize global features, such as continuous edges, parallel lines and relatively straight contours.

A number of prior art methods are known for selecting global features. One popular method uses Hough transforms to detect straight lines. However, we find that the Hough transforms do not work well for our aerial images, which contain many small line segments, such as building borders, car edges and other clutters, see FIG. 2. In addition, roads are not globally straight lines. We need to be able to detect contours with continuous curvatures.

Therefore, we use a method that 'grows' line segments and tolerates gaps between the line segments to detect global contours, includes straight and curved, and continuous and discontinuous contours. Our contour selection works on edge images. An edge image can be constructed by a Canny edge detector, with pre-determined threshold, or a threshold-free method that uses an explicit model for lines and their surroundings. This allows one to remove bias due to asymmetrical lines. The method extracts lines from the gradient image:

$$e(x, y) = \sqrt{f_x(x,y)^2 + f_y(x,y)^2} = \sqrt{f_x^2 + f_y^2}, \quad (5)$$

where $$f(x, y) = g_\sigma(x, y) * z(x, y) \quad (6)$$

and determes the following coefficients of a local Taylor polynomial:

$$e_x = \frac{f_x f_{xx} + f_y f_{xy}}{e} \quad (7)$$

$$e_y = \frac{f_x f_{xy} + f_y f_{yy}}{e} \quad (8)$$

$$e_{xx} = \frac{f_x f_{xxx} + f_y f_{xxy} + f_{xx}^2 + f_{yy}^2 - e_x^2}{e} \quad (9)$$

$$e_{xy} = \frac{f_x f_{xxy} + f_y f_{xyy} + f_{xx} f_{xy} + f_{xy} f_{yy} - e_x e_y}{e} \quad (10)$$

$$e_{yy} = \frac{f_x f_{xyy} + f_y f_{yyy} + f_{xy}^2 + f_{yy}^2 - e_y^2}{e} \quad (11)$$

Then the direction of (x, y) can be determined by calculating the eigenvalues and eigenvectors of a Hessian matrix $$H(x, y) = \begin{pmatrix} e_{xx} & e_{xy} \\ e_{xy} & e_{yy} \end{pmatrix}. \quad (12)$$

The eigenvector corresponding to the eigenvalue of maximum absolute value is a unit vector $(n_x, n_y)$. Then, we have $$(p_x, p_y) = (tn_x, tn_y) \quad (13)$$

$$t = -\frac{r_x n_x + r_y n_y}{r_{xx} n_x^2 + 2r_{xy} n_x n_y + r_{yy} n_y^2} \quad (14)$$

and $$(p_x, p_y) \in \left[-\frac{1}{2}, \frac{1}{2}\right] \times \left[-\frac{1}{2}, \frac{1}{2}\right]$$

declares a pixel as being associated with a line.

Figure 4:
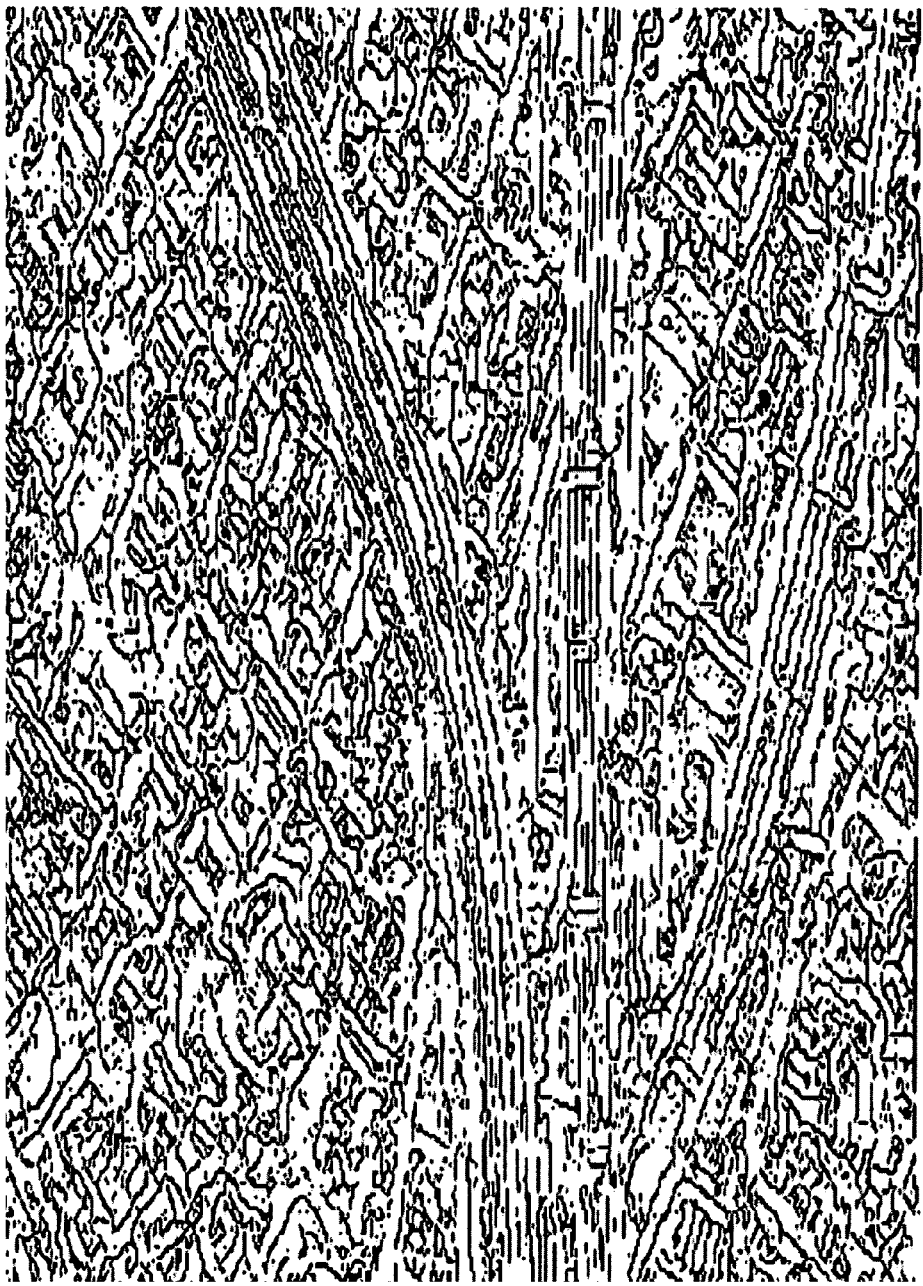
FIG. 4 is an edge image according to the invention.

FIG. 4 shows a threshold-free edge image 400 that we obtain with this line detection method.

Figure 5:
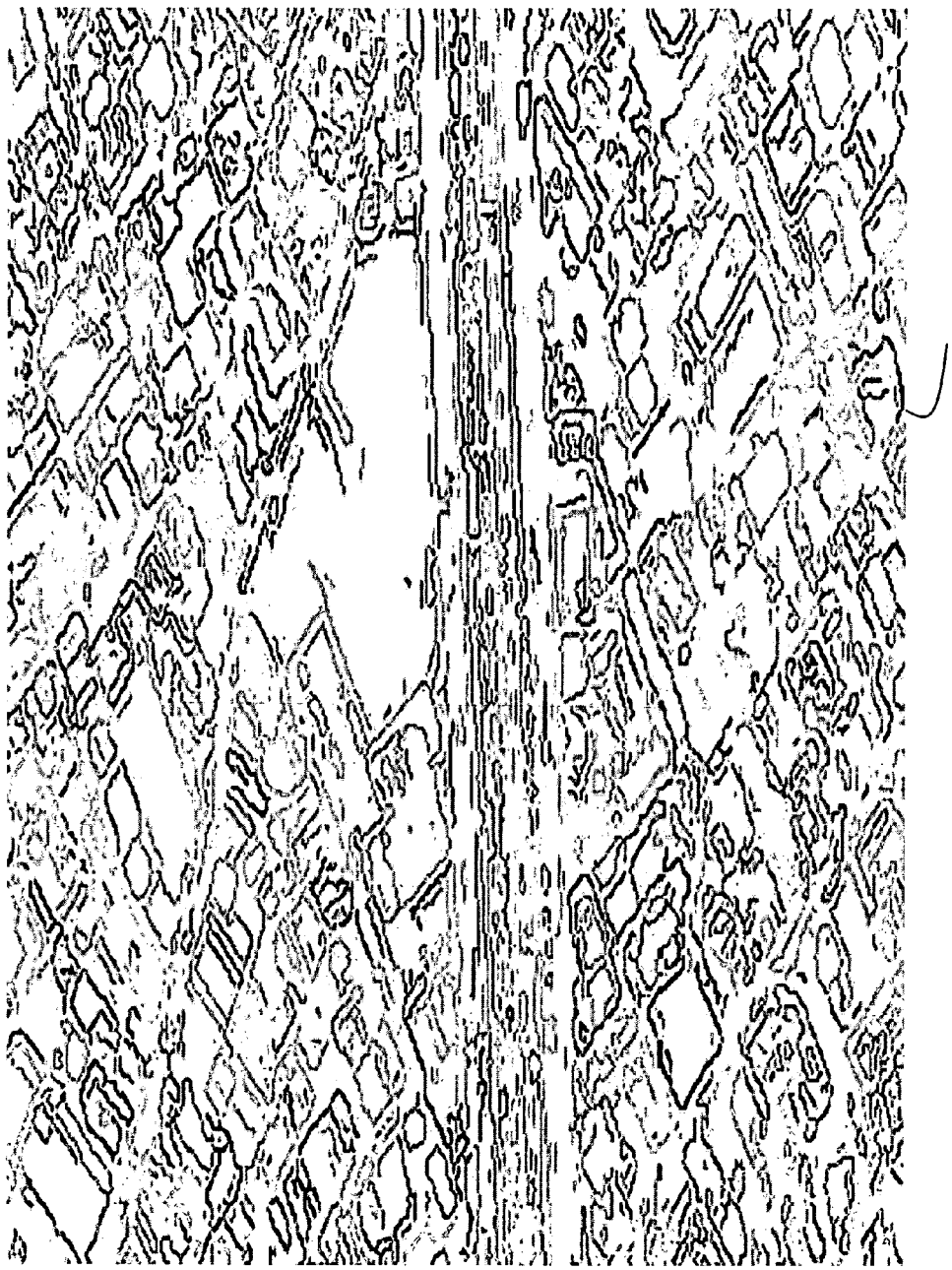
FIG. 5 is a contour image according to the invention.

FIG. 5 shows the corresponding contour image 500. We remove contours that are either closed or curves less than a predetermined length threshold, which are likely to be noises.

However, most aerial images of urban areas include buildings with strong edges, and large buildings appear to have long boundary contours, which are easily confused with road contours. Therefore, we approximate continuous contours with polylines according to an adaptation of the well known Douglas-Peucker algorithm, D. Douglas and T. Peucker, "Algorithms for the reduction of the number of points required to represent a digitized line or its caricature," *The Canadian Cartographer*, 10(2):112-122, 1973.

In aerial images, contours caused by building edges are usually closed and have more than four polygon vertices, while contours caused by road edges are usually open, and have less than four vertices.

Therefore, we select four high-level features from the mid-level contour features for each pixel. As for orientations, we use a local window.

Length

The high-level feature $L_{contour}$ represents the contour length, which indicates continuousness of a contour.

Compactness

Because most road contours are elongated open lines, their compactnesses is relatively low, compared to closed contours caused by other edges, such as building. The high-level feature $R_{contour}$ represents the contour ratio, which is defined as:

$$R_{contour} = \left| \log\left(\frac{P\ width_{contour}}{P\ length_{contour}}\right) \right|,$$

where Pwidth$_{contour}$ and Plength$_{contour}$ are the width and the length of a minimum rectangle which covers the entire contour segment.

Contour Number in Local Window

The high-level feature N$_{contour}$ is the number of pixels in the local window that are associated with a contour. Windows with a larger value of N$_{contour}$ are more likely to include roads.

Contour Orientation Entropy

The high-level feature E$_{contour}$ is the entropy of the contour with respect to orientation histograms along the contours. Obviously, a contour with a slightly changing curvature has lower entropies and is likely associated with a road, while a contour with a large curvature has a large entropy.

Color Features

In many computer vision applications, pixel intensity or color information is usually an important cue to recognize an object. However, in aerial images, the intensity and color of roads varies due to cars, shadows, and marking lines.

Therefore, we construct a color probability image, which can suppress areas with colors different from the usually black or grey road areas. For examples, pixels with light red or brown colors are given low probabilities because these are most likely buildings. Similarly, green pixels likely indicate parks, fields, road berms, and forests.

The high-level feature P$_{color}$ represents a pixel color distribution. We construct a color histogram H$_u$ from training images. Each (RGB) color channel has sixty-four bins in a range [0, 255]. Then, the color feature is the probability obtained by back-projection the trained color histogram onto the image 101.

Figure 6:
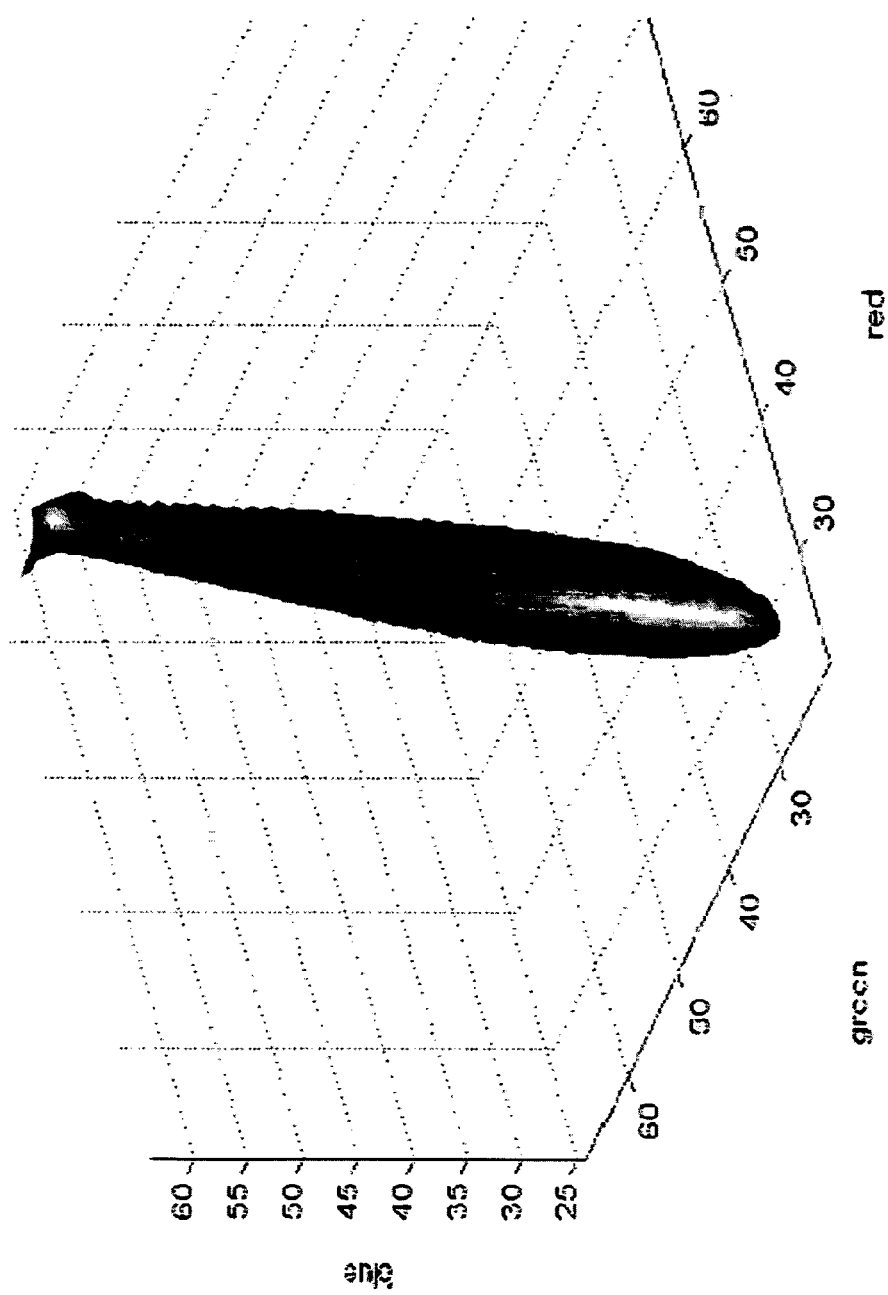
FIG. 6 is road color histogram according to the invention.

FIG. 6 shows a trained road-color-histogram according to the invention. The high-level histogram based color feature is also selected on a local window basis to be compatible with the other features.

Line Features

We also use a high-level line feature that is a line template M$_{template}$. Line segment can be characterized as an elongated rectangular region having a homogeneous intensity level that is bounded on both longer sides by homogeneous regions having a different intensity level. The assumption that road segments have the same contrast on both sides is rarely true for aerial images. Therefore, the invention uses a semi-linear structure that locates step edges on either side of the line.

An adequate line detector should also be able to detect lines anywhere in the range from one to ten pixels wide. In contrast with speckles and edges, a line pixel is generally adjacent to other line pixels. Hence, we filter to reduce noise and to produce higher scores for longer line structures.

A filter template is stretched along its detecting orientation. However, if only two such templates are used, as is typically done by orthogonal pairs in edge detection, then the accuracy of the line detection is limited, especially for lines that are oriented diagonally. The filter template can be extended in a direction perpendicular to the detection orientation to include distant pixels a center of the line. However, such an extension neglects the continuity property of the lines, and introduces errors especially in the presence of noise.

Therefore, we use a compass type directional filter set. The filter set includes multiple line filters at different orientations. Here, compass means each separate filter in the bank operates at a different orientation θ, and the entire set covers the full orientation spectrum [0, π]. For a M×N kernel, the basic filter operating at orientation θ is $$g(i,j) = \cos\left(\frac{\pi(i\cos\theta - j\sin\theta)}{2M}\right)\cos\left(\frac{\pi(i\sin\theta + j\cos\theta)}{N}\right),$$

where i=0, ..., M, and j=0, ..., N. The kernel size M, N determines the shape and width of the matching template. The filter has higher values near the center to reduce its sensitivity to the noise. Because a line is basically constructed by two opposite edges, the filter g includes two, zero-padded edge filter templates $g^a$ and $g^b$ to detect the step edges on the either side of the line such that $$g^a(i,j) = \begin{cases} g(i,j) & i > 0 \\ 0 & i < 0 \end{cases}, g^b(i,j) = \begin{cases} g(i,j) & j > 0 \\ 0 & j < 0. \end{cases}$$

From the half template responses, a line strength $s(p, \theta_i)$ at each pixel p for each filter $g_i$ is determined as $$s(p, \theta_i) = \begin{cases} g_i^a + g_i^b & g_i^a + g_i^b \geq 0 \\ 0 & g_i^a + g_i^b < 0. \end{cases}$$

However, there is a problem with fusing all line strengths. One cannot directly sum and average the orientation angles because of the ambiguity at the limits of the angular spectrum [0, θ). For example, two lines with orientation angles π−ε and ε lie in similar directions. Averaging their orientation angles gives $$\frac{\varepsilon}{2},$$

which is almost perpendicular to both lines. Therefore, it is an ambiguity to have relatively significant strengths for any orthogonal filter pair. To eliminate incompatible filter outcomes, and to merge any number of line strengths, we use a mapping from line directions to vectors, such that the perpendicular line strengths become opposite to each other.

Our reasoning is that as a line orientation becomes more similar to a directional filter, the response from the perpendicular filter should attenuate. This property can be exploited to find the orientation of the lines lying between compass filter orientations, instead of just selecting the direction of the filter having the maximum magnitude. If the filter directions are represented such that perpendicular responses cancel each other, then it is possible to fuse all the filter responses to derive an aggregated line orientation and strength.

We extend the angular spectrum of orientation from [0, π) to [0, 2π) and $s(p, \theta_i) \rightarrow s(p, \overline{\omega}_i) = s(p, \theta_i)e^{j2\theta_i}$, where $\overline{\omega}_i = 2\theta_i$, $s(p, \theta_i)$ is the response and direction for the i$^{th}$ directional template. Thus, perpendicular filter pairs are converted to inverse directions. Likewise, non-perpendicular filter pairs are correlated. By adding the transformed vectors, we subtract the responses of the perpendicular filters, and amplify the responses of non-perpendicular filters as $$s(p) = \sum_{i=0}^{3} \vec{s}(p, \omega_i)$$

for quadruple filters. The resulting vector is transformed to a line by halving the phase component.

This provides a point-wise evaluation of the likelihood of a line. To achieve local consistency, the mapping is performed within a circular window at each pixel position. Application of the above mapping attenuates the line strengths when the line orientations within the window have a high variance. After normalization to unity, the line magnitude and the line orientation are obtained as $$m(p) = \frac{|\vec{s}(p)|}{|\vec{s}_{max}|}, \; \theta(p) = \frac{\angle \vec{s}(p)}{2},$$

where $\vec{s}_{max}$ is the maximum line strength for the current image.

Texture Features

High-level texture features $L_{texture}$ 315, related to the local spectrum, can be used in our road detection system. The texture features are obtained by filtering the aerial image 101 with a set of two-dimensional Gabor filters. That filter is linear and local. The filter is characterized by a preferred orientation and a preferred spatial frequency. The aerial image is filtered with a set of Gabor filters with different preferred orientations and spatial frequencies, which cover appropriately the spatial frequency domain. Then, the texture features are obtained from a feature vector field.

The image I(x, y) 101 is convolved with a two-dimensional Gabor function g(x, y) to obtain a Gabor feature image r(x, y) as follows:

$$r(x, y) = \int\int_\Omega I(\xi, \eta) g(x-\xi, y-\eta) d\xi d\eta \tag{15}$$

$$g_{\lambda,\Theta,\varphi}(x, y) = \exp\left(-\frac{x'^2 + \gamma^2 y'^2}{2\sigma^2}\right) \cos\left(2\pi \frac{x'}{\lambda} + \varphi\right) \tag{16}$$

$$x' = x\cos\Theta + y\sin\Theta \tag{17}$$

$$y' = -x\sin\Theta + y\cos\Theta \tag{18}$$

Three different preferred spatial frequencies and eight different preferred orientations are used, resulting in a bank of 24 Gabor filters. Therefore, we obtain a 24-dimensional high-level, texture feature vector for each pixel of the image.

There are two ways to process our high-level feature vectors. One method determines different moments of the vectors with respect to local windows, and then treats the moments of the vectors as the texture signatures for corresponding local areas. However, such a moment-estimation method may not be appropriate for our classification, because the road directions can vary and the moment-based texture signatures are different for different oriented roads.

An alternative method uses complex moments features that are orientation independent. The complex moments of Gabor filter bank are determined by:

$$e_{\lambda,\Theta} = \sqrt{r^2_{\lambda,\Theta,0}(x, y) + r^2_{\lambda,\Theta,-\frac{1}{2}\pi}(x, y)} \tag{19}$$

$$p_{\lambda,\Theta} = r^2_{\lambda,\Theta,0}(x, y) + r^2_{\lambda,\Theta,-\frac{\pi}{2}}(x, y) \tag{20}$$

$$C_{mn}(x, y) = \int\int (u + iv)^m (u - iv)^n \tilde{p}_{u,v}(x, y) du dv \tag{21}$$

$$u = \frac{1}{\lambda}\cos\Theta, \; v = \frac{1}{\lambda}\sin\Theta, \; \tilde{p}_{u,v}(x, y) = p_{\lambda,\Theta}(x, y) \tag{22}$$

In equation (19), the Gabor-energy is defined with combination of a symmetric $\lambda$ and an asymmetric filter $\Theta$. Equation (20) defines the complex moment. The sum m+n is called the order of the complex moment, and is related to the number of dominant orientations in the texture. A complex moment with even order m+n has the ability to discriminate textures with $$\frac{m+n}{2}$$

dominant orientations. Therefore, we use two features, moments of order two $C_{11}$ and $C_{20}$, which correspond to m=1, n=1 and m=2, n=0, (identical with m=0, n=2) in the equation 21, to detect textures with a single dominant orientation.

Figure 7A:
FIG. 7A is an example aerial image.
Figure 7B:
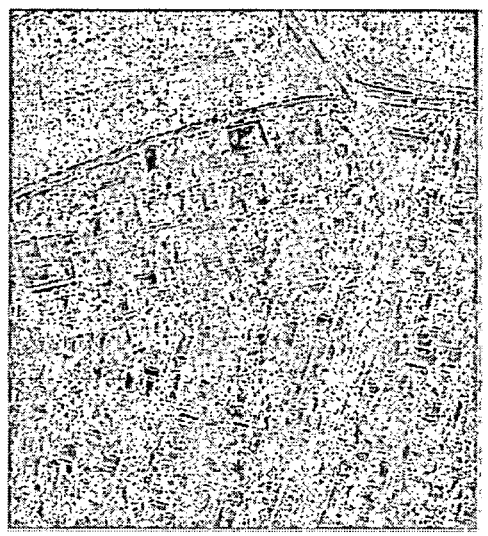
FIGS. 7B and 7C are corresponding texture images.
Figure 7C:
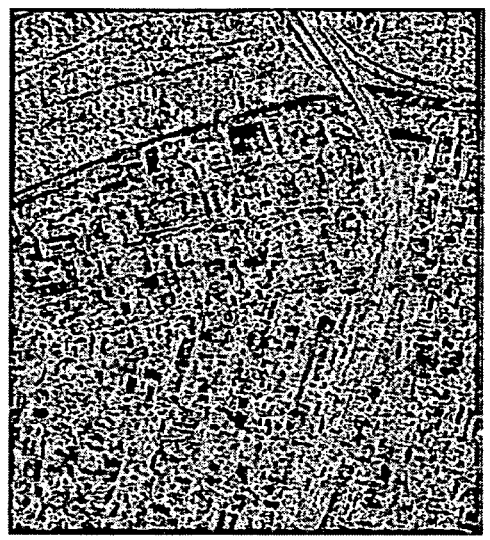

FIG. 7A shows an input image, FIG. 7B shows the corresponding texture image for moments $C_{11}$, and FIG. 7C the texture image for moments $C_{20}$. Thus, the complex moments can be treated as texture signatures, without any specifications on orientations. The complexity of convolving with a Gabor filter bank can be reduced by a convolution in the frequency domain with a fast Fourier transform (FFT), and a complementary inverse FFT.

Classification

The classification 320 can be linear or non-linear.

Linear Classifier

A linear classifier is a weighted combination of all probability images corresponding to all of the high-level features. We determine a weight vector w that makes all of the inner products of $w_t f_i = 1_i$, where $1_i$ is the probability assigned to a corresponding pixel. The probability can be assigned by a voting scheme, or a weighed average, as described below.

All of the high-level features used by the classifier 320 are determined by a sliding local window. Therefore, each pixel is assigned a feature vector f. The label 1 that is assigned to the pixel is the probability that the pixel is part of a road to obtain the probability image 321 of possible road areas. We replace the problem of finding a solution to a set of linear equations, which can be solved by a minimum squared-error (MSE) and pseudo-inverse.

Based on training data, we reformulate the problem by using an nxd matrix Y. The $i^{th}$ row is in the matrix is the high-level feature vector $f_i$. A column vector b includes the classified labels of training data. A column vector w includes weights for the various high-level features. We determine our weight vector w of the linear classifier by using a MSE solution on all the training data, Thus, we have $$Y_w = b \quad (23)$$
$$w = (Y^tY)^{-1}Y^tb$$
$$= Y + b \quad (24)$$

It should be noted that a support vector machine (SVM) can also be used to classified the pixels.

Non-Linear Classifier

A non-linear classifier can be constructed as a multi-layer neural network (MLN). The MLN is based on the idea that the parameters governing the non-linear mapping are learned at the same time as those governing the linear discriminants. We use a three-layer network, and use back-propagation to train coefficient of network. The input layer has thirteen nodes. There are twenty hidden nodes in the middle layer, and one node in the output layer.

Feature Normalization

To convert the values of all of the different high-level features to a common probability image, we need to normalize the values of all of the high-level features to the same probability range of real values, e.g., probabilities in the range of zero to one. We do this with a set of mapping functions $F_i$ as described in equation (26) below. The mapping functions (26) include linear and non-linear functions.

For a particular pixel (x, y), a column vector is f(x, y), with assumption that f(x, y)∈Θ. Each element $f_i$ is the $i^{th}$ high-level feature value. The vector p(x, y) contains the probabilities for each pixel in the probability image, such that p∈Ψ. Thus, we define:

$$F:\Phi \rightarrow \Psi, F(f)=p, F_i(f_i)=p_i. \quad (25)$$

Each mapping function for constructing the probability image is defined by the following equation set:

$$h_{max}: \quad (26)$$
$$F_1(u) = u$$
$$E_h:$$
$$F_2(u) = \exp(-2u))$$
$$E_{wh}:$$
$$F_3(u) = \exp(-2u)$$
$$\mu_c:$$
$$F_4(u) = \left(\frac{u - \min_{(x,y)\in I}(u)}{\max_{(x,y)\in I}(u) - \min_{(x,y)\in I}(u)}\right)^3$$
$$\upsilon_c:$$
$$F_5(u) = \exp\left(-\left[\frac{\upsilon_c}{0.5 \max_{(x,y)\in I}(u)}\right]^2\right)$$
$$R_{gh}:$$
$$F_6(u) = \left(\frac{u - \min_{(x,y)\in I}(u)}{\max_{(x,y)\in I}(u) - \min_{(x,y)\in I}(u)}\right)^2$$
$$R_{wgh}:$$
$$F_7(u) = \left(\frac{u - \min_{(x,y)\in I}(u)}{\max_{(x,y)\in I}(u) - \min_{(x,y)\in I}(u)}\right)^2$$
$$L_{contour}:$$
$$F_8(u) = \frac{u}{\max_{(x,y)\in I}(u)}$$

-continued
$$R_{contour}:$$
$$F_9(u) = 1 - \exp(-u)$$
$$N_{contour}:$$
$$F_{10}(u) = \frac{u}{\max_{(x,y)\in I}(u)}$$
$$E_{contour}:$$
$$F_{11}(u) = \exp(-u)$$
$$P_{color}:$$
$$F_{12}(u) = u$$
$$M_{template}:$$
$$F_{13}(u) = u$$
$$L_{texture}:$$
$$F_{14}(u) = u$$

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting roads in an aerial image of ground topology, comprising:
   determining low-level features for each pixel in an aerial image of ground topology;
   determining middle-level features for each pixel from the low-level features;
   placing a first window over each pixel, the first window including adjacent pixels to each pixel;
   determining high-level features for all of the pixels in the first window from the middle-level features of all of the pixels in the first window; and
   assigning a single probability to each pixel based on the high-level features, the single probability indicating a likelihood that the pixel is associated with a road.

2. The method of claim 1, in which the low-level features are intensity values of the pixels, and gradients of the intensity values, and the mid-level features include orientations, edges and contours related to visual characteristics of the ground topology, and the high-level features include orientation, contour, color, line, and texture features.

3. The method of claim 1, in which the visual characteristics are related to physical characteristics of the ground topology, the physical characteristics including geometrical, textural, and contextual features.

4. The method of claim 1, further comprising:
   filtering the aerial image in a pre-processing step by applying an adaptive 2D Gaussian low-pass Wiener filter to each pixel, the pixel using a 5×5 pixel neighborhood to estimate a mean and a standard deviation of a local gradient of each pixel.

5. The method of claim 1, further comprising:
   partitioning the aerial image into non-overlapping blocks; and
   determining an orientation of each pixel in each block.

6. The method of claim 1, in which the probabilities form a probability image, and further comprising:
   filtering the probability image a median filter.

7. The method of claim 1, in which the low-level features include intensity of the pixels, and further comprising:
  filtering the intensity values of the pixels;
  determining local intensity gradients of each pixel;
  constructing a gradient magnitude image from the local gradients; and
  filtering the gradient magnitudes to construct an orientation image, each pixel in the orientation image having an orientation.

8. The method of claim 7, further comprising:
  constructing an edge image from the gradient magnitude image, the edge image including edge pixels; and
  constructing a contour image from the edge image.

9. The method of claim 8, further comprising:
  constructing an orientation histogram within a second window centered at each pixel using the local gradients; and
  constructing contours by connecting the edge pixels.

10. The method of claim 9, in which the orientation histogram associated with each second window has twelve bins in a range between 0 and $\pi$ radians, the radians corresponding to the edge pixels.

11. The method of claim 10, in which a first high-level feature is a maximum value of the orientation histogram, a second high-level feature is an entropy of the orientation histogram, a third high-level feature is an entropy of a weighted orientation histogram, a fourth high-level feature is a mean of the orientation histogram, a fifth high-level feature is a variance of the orientation histogram, a sixth high-level feature is a similarity measure between the orientation histogram and an idealized single-modal density function model of the road, and a seventh high-level feature is a weighted similarity measure.

12. The method of claim 1, in which the first windows overlap.

13. The method of claim 1, further comprising:
  normalizing values associated with the high level features to a common range of normalized probabilities.

14. The method of claim 13, in which the normalization uses linear and non-linear functions.

15. The method of claim 13, in which the assigning of the single probability to each pixel further comprises:
  aggregating the normalized probabilities of the high-level features for each pixel.

* * * * *